United States Patent
Lekutai

(10) Patent No.: US 11,252,533 B2
(45) Date of Patent: Feb. 15, 2022

(54) UAV SUPPORTED VEHICLE-TO-VEHICLE COMMUNICATION

(71) Applicant: T-Mobile USA, Inc., Bellevue, WA (US)

(72) Inventor: Gaviphat Lekutai, Kirkland, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 0 days.

(21) Appl. No.: 16/213,226

(22) Filed: Dec. 7, 2018

(65) Prior Publication Data

US 2020/0186964 A1 Jun. 11, 2020

(51) Int. Cl.
*H04W 4/00* (2018.01)
*H04W 4/024* (2018.01)
(Continued)

(52) U.S. Cl.
CPC .......... *H04W 4/024* (2018.02); *B64C 39/024* (2013.01); *G08G 1/012* (2013.01); *G08G 1/0125* (2013.01); *G08G 1/052* (2013.01); *G08G 1/056* (2013.01); *G08G 1/091* (2013.01); *H04W 4/027* (2013.01); *H04W 4/44* (2018.02);
(Continued)

(58) Field of Classification Search
CPC ............ H04B 7/18504; H04B 7/18506; H04B 7/18508; H04B 7/18539; H04B 7/18567; H04B 7/185; H04B 7/18513; H04B 7/18523; H04B 7/18563; H04W 84/005; H04W 84/06; H04W 8/245; H04W 88/02;
(Continued)

(56) References Cited

U.S. PATENT DOCUMENTS

2015/0063202 A1* 3/2015 Mazzarella ........ H04B 7/18504
370/316
2016/0028471 A1* 1/2016 Boss ................. H04W 28/0289
455/406
(Continued)

FOREIGN PATENT DOCUMENTS

| CN | 107317700 A | 11/2017 |
| EP | 3401786 A3 | 2/2019 |
| WO | 2018182708 A1 | 10/2018 |

OTHER PUBLICATIONS

European Application No. 19208904.3, Partial European Search Report dated Apr. 1, 2020, 11 pages.
(Continued)

*Primary Examiner* — Huy C Ho
(74) *Attorney, Agent, or Firm* — Han Santos, PLLC

(57) ABSTRACT

The use of unmanned aerial vehicle (UAV) communication cells in conjunction with MEC nodes may provide low-latency processing of vehicle movement data to generate vehicle guidance instructions for vehicles. Vehicle movement data of vehicles are received at a base station of a wireless carrier network from a UAV communication cell that is attached to the base station. The base station sends the vehicle movement data to a mobile edge computing (MEC) node that directly communicates with the base station so that the MEC node generates vehicle guidance instructions. The vehicle guidance instructions are then received by the base station from the MEC node. In turn, the base station sends the vehicle guidance instructions to the UAV communication cell for broadcasting to vehicles.

20 Claims, 7 Drawing Sheets

(51) Int. Cl.
| | |
|---|---|
| *H04W 4/44* | (2018.01) |
| *B64C 39/02* | (2006.01) |
| *G08G 1/01* | (2006.01) |
| *G08G 1/052* | (2006.01) |
| *G08G 1/056* | (2006.01) |
| *G08G 1/09* | (2006.01) |
| *H04W 4/02* | (2018.01) |
| *H04W 88/08* | (2009.01) |

(52) U.S. Cl.
CPC .. *B64C 2201/122* (2013.01); *B64C 2201/141* (2013.01); *H04W 88/08* (2013.01)

(58) Field of Classification Search
CPC ..... H04W 24/02; H04W 24/00; H04W 24/06; H04W 24/08
USPC ........................................................ 455/431
See application file for complete search history.

(56) References Cited

U.S. PATENT DOCUMENTS

2017/0358221 A1   12/2017  Priest
2018/0319495 A1*  11/2018  Tu ...................... H04B 7/18504
2019/0079659 A1*  3/2019   Adenwala ........... G06F 3/04842

OTHER PUBLICATIONS

European Patent Application No. 19208904.3, European Search Report dated Jun. 16, 2020, 11 pages.
Chinese Patent Application No. 201911204071.2, Office Action dated Jun. 25, 2021, 8 pages.

* cited by examiner

UAV SUPPORTED VEHICLE-TO-VEHICLE COMMUNICATION

BACKGROUND

Vehicle-to-everything (V2X) communication is communication technology that provides communication between vehicles and other entities. The entities may include bridges, toll booths, nearby buildings, law enforcement checkpoints, unmanned aerial vehicles (UAVs), or even cyclists and pedestrians that are equipped with mobile communication devices. One specific form of V2X communication is vehicle-to-vehicle (V2V) communication, which is communication between multiple vehicles. V2V communication may be used to convey important information to drivers of the vehicles, such as warning message regarding road conditions, nearby accidents, inclement weather conditions, and/or dangerous behaviors of other vehicles. Further, V2V communication may be used to coordinate the self-driving behaviors of multiple autonomous vehicles, provide automatic lane change assistance for vehicles, activate automatic emergency vehicle braking of vehicles, etc.

V2X or V2V communication may be implemented using short-range wireless communications between vehicles and other entities. However, the limited operating range of such communications means that a vehicle may be unable to obtain sufficient information regarding events that are out of the immediate vicinity of the vehicle due to the inability to communicate with more distant vehicles. Such constraints may impact the ability of the vehicle to react to events or changes in driving conditions in a timely manner. Further, vehicles that use short-range wireless communication are unable to communicate with centralized data centers that can process vehicle movement data from a large number of vehicles. As a result, such vehicles are constrained by the processing capabilities of their onboard computers in reacting to traffic events.

V2X or V2V communication may also be implemented using long-range wireless communication services offered by wireless carrier networks. The use of a wireless carrier network greatly expands the number of vehicles that are able to exchange vehicle movement data with each other, as well as provides the vehicles with access to the data processing capabilities of centralized data centers. However, a wireless carrier network uses a core network and multiple base stations to provide wireless communication services to user devices. The routing of the communication traffic between the multiple base stations and the core network may cause undesirable latency. For example, the total time for routing communication data between a vehicle that is being serviced by a first base station to the core network, and from the core network to another vehicle that is being serviced by a second base station may be as long as ten milliseconds. Additionally, high usage demand or network congestion at the base stations may cause further delay in the routing of the communication data. In contrast, V2V communication generally requires ultra-reliable low latency communication (URLLC). In some instances, V2V communication between vehicles with a latency of more than two milliseconds may result in a collision or accident due to the traveling speeds of the vehicles.

BRIEF DESCRIPTION OF THE DRAWINGS

The detailed description is described with reference to the accompanying figures, in which the left-most digit(s) of a reference number identifies the figure in which the reference number first appears. The use of the same reference numbers in different figures indicates similar or identical items.

DETAILED DESCRIPTION

Figure 1:
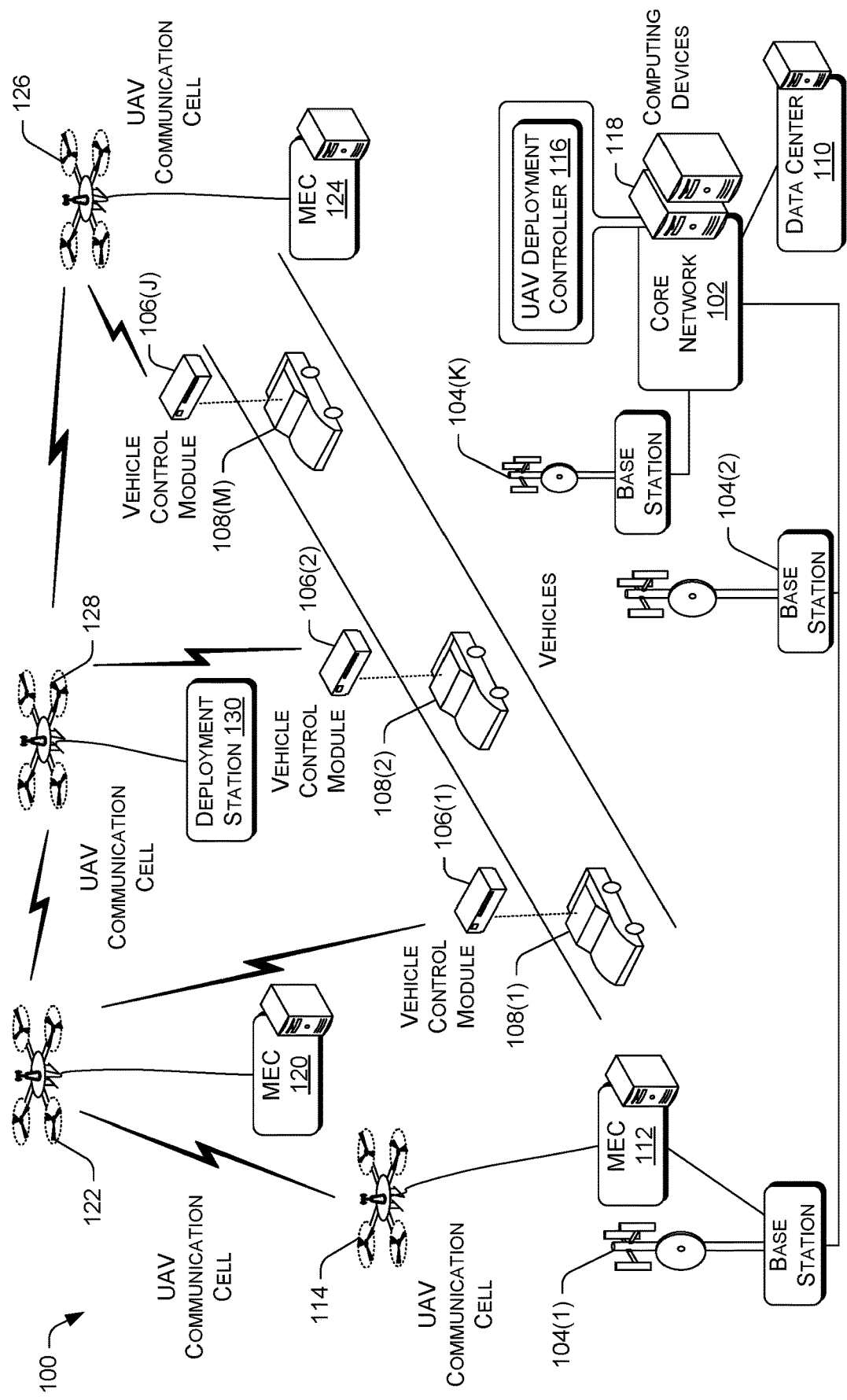
FIG. 1 illustrates an example environment for deploying UAV communication cells to support cellular vehicle-to-everything (CV2X) communication.

This disclosure is directed to the use of unmanned aerial vehicle (UAV) communication cells that are attached to base stations or mobile edge computing (MEC) nodes to provide ultra-reliable low latency communication (URLLC) cellular vehicle-to-everything (V2X) communication, also referred to as CV2X communication, for vehicles. In some instances, the MEC nodes are deployed in conjunction with base stations of a wireless carrier network in a paired fashion. Each of the MEC nodes is configured to provide localized processing of vehicle movement data as received via V2X communication with vehicles. For example, the vehicle movement data may indicate traffic congestion, traffic slow down, vehicular accidents, etc. Accordingly, a MEC node may generate vehicle guidance instructions for vehicles in the vicinity of a paired base station based on the vehicle movement data received at the paired base station. For example, the vehicle guidance instructions may include driving condition warnings, automatic lane changing or braking directives, autonomous vehicle operations commands (e.g., braking, changing lanes, making turns, etc.). In turn, the paired base station may send the vehicle guidance instructions to vehicles in the vicinity of the paired base station.

The generation of the vehicle guidance instructions by a MEC node that is locally paired with a base station may reduce communication latency. This is because the base station may bypass the use of a core network of the wireless carrier network to send the vehicle movement data to a centralized data center for processing into vehicle guidance instructions, as well as by pass the return of the vehicle guidance instructions from the centralized data center back to a base station via the core network. In such instances, the MEC node or the base station may be equipped with an attached UAV communication cell. The attached UAV communication cell may be tethered to the MEC node or the base station by a physical wire that provides communication and power to the attached UAV communication cell. Alternatively, an attached UAV communication cell may be a free-flying UAV communication cell that communicates wirelessly with the MEC node or the base station, but the attached UAV communication cell is configured to exclusively service the MEC node or the base station and stay within a predefined distance from the MEC node or the base station. In some embodiments, the attached UAV communication cell may be deployed by a MEC node to directly receive vehicle movement data from vehicles when the base station experiences a volume of communication traffic that is above a threshold. The deployment of a UAV communication cell involves directing the UAV communication cell to hover at a predetermined altitude above the MEC node or the base station. The deployment of the attached UAV communication cell may enable the MEC node to receive the vehicle movement data from vehicles without the involvement of the base station. In other embodiments, the attached UAV communication cell may be deployed to act as a temporary replacement base station when the base station experiences an operation outage, so that the MEC node is able to perform its functions without the base station.

In other instances, MEC nodes with attached UAV communication cells may be placed at certain geographical locations without paired base stations. This is because, while a base station may cover a geographical region that has an area of several square kilometers, the low latency requirement of ultra-reliable low latency CV2X communication means that a MEC node has to be deployed within several hundred meters of vehicles to minimize communication latency with such vehicles. Depending on service demand in a given area, the MEC nodes may be installed at a much higher density, installed at the same density, or installed at a lower density in the given area than the base stations. In such instances, an installed MEC node may deploy an attached UAV communication cell to receive vehicle movement data from vehicles in the vicinity. The MEC node processes the vehicle movement data into vehicle guidance instructions for one or more vehicles, and then uses the attached UAV communication cell to transmit the vehicle guidance instructions to the one or more vehicles. In this way, the use of MEC nodes with attached UAV communication cells may enable the MEC nodes to service vehicles independently of the base stations.

In additional instances, the UAV communication cells may be deployed from standalone UAV deployment stations. A standalone UAV deployment station is a structure that is configured to house an attached UAV communication cell when the UAV is not airborne and provide power to the UAV via a wired cable when the UAV is deployed. Alternatively, the wired cable may be replaced with a recharging or refueling dock that enables a free flying UAV communication cell to receive power when the UAV is not airborne. A deployed free flying or tethered UAV communication cell may hover at a predetermined altitude to wirelessly relay vehicle movement data of vehicles to other UAV communication cells that are attached to MEC nodes. In this way, the UAV communication cells that are deployed from the standalone UAV deployment stations may act as relay cells that increase the communication range of the attached UAV communication cells.

Indeed, any UAV communication cell, whether attached or unattached, may relay vehicle movement data to another UAV communication cell or receive vehicle movement data from another UAV communication cell. Such capabilities may enable the UAV communication cells to act as a mesh network or a distributed computing network to provide redundant communication and/or data processing capabilities. For example, when a MEC node of an attached UAV communication cell malfunctions, the attached UAV communication cell may simply use a wireless communication link to send vehicle movement data that it receives to a neighboring UAV communication cell that has a functioning MEC node for processing. In turn, the neighboring UAV communication cell may return processed vehicle guidance instructions to the UAV communication cell for transmission to one or more vehicles. In another example, because multiple UAV communication cells have the ability to wirelessly communicate with each other, the multiple UAV communication cells may also act as a distributed computing network to process vehicle movement data without the involvement of MEC nodes.

The use of attached or unattached UAV communication cells in conjunction with MEC nodes may provide low-latency processing of vehicle movement data received from vehicles to generate vehicle guidance instructions for one or more vehicles. This is because the vehicle movement data can be processed locally at the MEC nodes to generate vehicle guidance instructions, rather than relayed by the core network of a wireless carrier network to a centralized data center for processing and eventual return of the same vehicle guidance instructions. Example implementations are provided below with reference to the following FIGS. 1-7.

Example Environment Architecture

FIG. 1 illustrates an example environment for a wireless carrier network to use modular UAV communication components to provide wireless communication coverage. The environment 100 may include a wireless carrier network that is operated by a wireless telecommunication carrier. The wireless carrier network may include a core network 102 and radio access network. The radio access network may include multiple base stations, such as base stations 104(1)-104(K). Each of the base stations 104(1)-104(K) may provide a corresponding network cell that delivers telecommunication and data communication coverage. The core network 102 may use the network cells to provide wireless communication services to user devices. The core network 102 may include components that support 2G and 3G voice communication traffic, as well as 3G, 4G, and 5G data communication traffic. For example, 3G data communication traffic between a user device and the Internet may be routed through a gateway of a 3G Packet Switch (PS) Core. On the other hand, 3G voice communication traffic between the user device and a Public Switched Telephone Network (PSTN) may be routed through a Mobile Switch (MSC) of a 3G Circuit Switch (CS) core. The core network 102 may further include components that support 4G and 5G voice and data communication traffic. Such components may include an Evolved Packet Core (EPC) and an IP Multimedia Subsystem (IMS) core. The IMS core may provide the user devices with data access to external packet data networks, such as the networks of other wireless telecommunication providers, as well as backend servers in the core network 102.

Accordingly, the base stations 104(1)-104(K) are responsible for handling voice and data traffic between user devices and the core network 102. In some instances, the user devices may include smartphones, tablet computers, embedded computer systems, or any other device that is capable of using the wireless communication services that are provided by the wireless carrier network. For example, the user devices may include onboard vehicle control modules 106(1)-106(J) that are installed on vehicles 108(1)-108(M). Each of the vehicle control modules 106(1)-106(J) may be equipped with a cellular communication transceiver, such as an LTE transceiver, that enables the vehicle control module to exchange communication data using CV2X. For example, a vehicle control module may establish an eNodeB to endpoint channel, such as a LTE-Uu interface, or some other equivalent interface of CV2X communication, to communicate with a base station. For example, the interface may be established using an unlicensed band (e.g., 5.9 GHz unlicensed band) reserved for V2X or a licensed cellular spectrum band that is used by the wireless carrier network. Further, the vehicle control module may establish an eNodeB to endpoint channel, such as a PC5 interface, or some other equivalent interface of CV2X communication, to communicate with the vehicle control modules on other vehicles. Accordingly, a vehicle control module may use these interfaces to receive information regarding other vehicles from a base station or another vehicle control module. The information may include vehicle movement data and vehicle guidance instructions. The vehicle movement data may indicate the movements (e.g., a current vehicle location, a direction of travel, a speed of travel, an acceleration rate, a deacceleration rate, etc.) of other vehicles in the vicinity. Additionally, the vehicle control module of a vehicle may also generate vehicle movement data regarding the vehicle for transmission to other vehicles or the UAV communication cells.

The vehicle guidance instructions may be instructions provided by a vehicle control module in another vehicle or a trusted traffic coordination authority to vehicles in a geographical area to instruct the vehicles to perform driving-related tasks. For example, a centralized data center 110 of the trusted traffic coordination authority may receive vehicle movement data in a geographical area from the wireless carrier network. The vehicle movement data may be collected by one or more of the base stations 104(1)-104(K) from the vehicle control modules 106(1)-106(J) and delivered to the centralized data center 110 by the core network 102 of the wireless carrier network. In turn, the centralized data center 110 may process the vehicle movement data to generate vehicle guidance instructions for one or more vehicles. The vehicle guidance instructions are then sent back to the one or more vehicles via the core network 102 and one or more of the base stations 104(1)-104(K).

In some embodiments, a vehicle control module may provide the vehicle with multiple capabilities based on received vehicle movement data and/or vehicle guidance instructions. Such capabilities may include full autonomous driving capabilities, driving assistance capabilities, and/or driver notification capabilities. The full autonomous driving capabilities may enable a vehicle control module to autonomously drive a vehicle without any input from a human operator. The driving assistance capabilities may enable a vehicle control module to take control of a vehicle in the event of an emergency to avoid an accident, such as by providing automatic lane change or automatic vehicle braking. The driver notification capabilities may enable a vehicle control module to use a display or a speaker in a vehicle to present audio or visual warnings regarding road conditions, traffic conditions, and/or emergency conditions to a driver of the vehicle. The warnings may enable the driver to take corrective or avoidance action. However, in some instances, the routing of vehicle movement data and vehicle guidance instructions via the base stations 104(1)-104(K) and the core network 102 may result in network latency that negatively impact the ability of vehicle control modules 106(1)-106(J) to timely perform actions for avoiding accidents.

In various embodiments, mobile edge computing (MEC) nodes and UAV communication cells may be deployed to reduce network latency associated with routing data to and from the centralized data center 110 via the core network 102 and the base stations 104(1)-104(K). These MEC nodes and UAV communication cells may be deployed in a geographical region such that vehicles traveling through the region are no farther than a few hundred meters from a MEC node or a UAV communication cell. In at least one embodiment, the base station 104(1) may be paired with a MEC node 112 that is equipped with a UAV communication cell 114. The MEC node 112 may be installed in the vicinity of the base station 104(1), and communicatively coupled to the base station 104 via a wired communication connection. For example, the wired connection may be an Ethernet connection, a Universal Serial Bus (USB) connection, or some other wired communication connection. The wired connection provides a dedicated link between the MEC node 112 and the base station 104 that is independent of a backhaul that connects the base station 104 to the core network 102 of the wireless carrier network. The MEC node 112 may include processors and memory that are configured to process vehicle movement data to generate vehicle guidance instructions. For example, the UAV communication cell 114 may be in the form of a fixed-wing aircraft, a rotary wing aircraft, a rigid buoyant gas airship, or a non-rigid buoyant gas airship that is connected to the MEC node 112 via a physical cable. The physical cable may be retractably housed in a spool that is mounted to the MEC node 112. The physical cable may include one or more wires that provide power to the UAV communication cell 114, as well as provide a communication link between the MEC node 112 and the UAV communication cell 114. This means that the UAV communication cell 114 is configured to stay within a predefined distance of the MEC node 112 in order to service the MEC node 112. Additionally, the UAV communication cell 114 may be equipped with a cellular communication transceiver that enables the UAV communication cell 114 to communicate with the vehicle control modules via LTE-Uu or equivalent interfaces, as well as communicate with other UAV communication cells via PC5 or equivalent interfaces. The MEC node 112 may be equipped with a dock or enclosure for the UAV communication cell 114 to be parked and housed when the UAV communication cell 114 is not airborne.

Accordingly, the MEC node 112 may deploy the UAV communication cell 114 to a predetermined altitude to collect vehicle movement data of vehicles in a geographical area. In some embodiments, the MEC node 112 may be directed by a UAV deployment controller 116 to deploy the UAV communication cell 114. The UAV deployment controller 116 may be executed by one or more computing devices 118 of the core network 102 to direct the deployment of UAV communication cells for the wireless carrier network in response to various deployment conditions. In some instances, the UAV deployment controller 116 may direct the UAV communication cell 114 to be deployed when a number of user devices that are connected to the base station 104(1) exceeds a predetermined number threshold. In another example, the UAV deployment controller 116 may direct the MEC node 112 to deploy the UAV communication cell 114 when vehicle traffic data provided by a traffic monitoring service indicates that a number of vehicles in a geographical area serviced by the base station 104(1) exceeded a predetermined number threshold. In other instances, the MEC node 112 may be commanded to deploy the UAV communication cell 114 when the base station 104(1) reports that it has experienced an outage or communication traffic overload. A traffic overload condition may exist if a predetermined number of user devices serviced by the base station 104(1) report that a quality of service (QoS) value has dropped below or exceeded a threshold. For example, a QoS value may measure a number of dropped calls, a data throughput rate, a number of data packet transmission retries, etc. In such instances, the UAV deployment controller 116 may also instruct the UAV communication cell 114 to deactivate once a corresponding condition that triggered the deployment is no longer present or ceases to exist for a predetermined amount of time. Upon deactivation, the UAV communication cell 114 may land at the dock or in the enclosure of the MEC node 112 such that it is ready for the next deployment. In additional instances, the UAV deployment controller 116 may command the UAV communication cell 114 to be deployed and deactivated based on a deployment schedule that correlates with historical high vehicle traffic times. In other embodiments, the MEC node 112 may independently perform these deployment and deactivation decisions instead of the UAV deployment controller 116.

The MEC node 112 may process the vehicle movement data received by the UAV communication cell 114 and/or the base station 104(1) to generate vehicle guidance instructions. In additional embodiments, the base station 104(1) may be equipped with a UAV communication cell in a similar manner as the MEC node 112, such that the base station 104(1) is able to deploy the UAV communication cell to receive CV2X communication of vehicle movement data from vehicles. In some embodiments, the base station 104(1) may deploy and deactivate the UAV communication cell based on a deployment schedule that correlates with historical high vehicle traffic times. In other embodiments, the base station 104(1) may deploy the UAV communication cell when its own cellular communication transceiver malfunctions or is otherwise overloaded.

In other embodiments, MEC nodes with attached UAV communication cells may be placed at certain geographical locations without paired base stations. For example, MEC node 120 may be deployed with an attached UAV communication cell 122. Likewise, MEC node 124 may be deployed with an attached UAV communication cell 126. Each of the UAV communication cells 122 and 126 may be physically connected to their respective MEC nodes in a similar manner as the UAV communication cell 114 to the MEC node 112. In some embodiments, the UAV communication cells 122 and 126 may be deployed and deactivated by the UAV deployment controller 116. In such embodiments, a base station or a UAV communication cell of a paired MEC node, such as the base station 104(1) or the UAV communication cell 114, may be used by the UAV deployment controller 116 to relay the deploy and deactivation commands to the MEC nodes 120 and 124. In other embodiments, each of the UAV communication cells 122 and 126 is capable of being independently deployed and deactivated by its corresponding MEC node based on a predetermined schedule or deployed and deactivated upon requests that are initiated by a neighboring MEC node. The neighboring MEC node may send its commands to the MEC nodes 120 and 124 via its attached UAV communication cell. Accordingly, each of the MEC nodes 120 and 124 may process the vehicle movement data received by its attached UAV communication cell to generate vehicle guidance instructions for one or more vehicles, and then use the attached UAV communication cell to transmit the vehicle guidance instructions to the one or more vehicles. In this way, the MEC nodes 120 and 124 may service vehicles independently of the base stations.

In additional embodiments, the UAV communication cells may be deployed from standalone UAV deployment stations. For example, a UAV communication cell 128 may be deployed from a standalone UAV deployment station 130. The standalone UAV deployment station 130 may be a structure that is configured to house an attached UAV communication cell 128 when the UAV communication cell 128 is not airborne. The standalone UAV deployment station 130 may provide power to the UAV via a wired cable when the UAV communication cell 128 is deployed. In some embodiments, the UAV communication cell 128 may be deployed by the UAV deployment controller 116. In such embodiments, a base station or a UAV communication cell of a paired MEC node, such as the base station 104(1) or the UAV communication cell 114, may be used by the UAV deployment controller 116 to relay the deploy and deactivation commands to the UAV deployment station 130. In other embodiments, the UAV deployment station 130 may deploy or deactivate the UAV communication cell 128 upon a request from a neighboring MEC node or based on a predetermined schedule. The neighboring MEC node may send its commands to the UAV deployment station 130 via its attached UAV communication cell.

In one scenario, a UAV communication cell may be used as a relay communication cell by other UAV communication cells for cell-to-cell communication. For example, the MEC node 124 may direct the UAV communication cell 126 to forward vehicle movement data of particular vehicles in its covered geographical area to the UAV communication cell 122. This is because the particular vehicles are traveling towards a geographical area covered by the MEC node 120 and the attached UAV communication cell 122. Thus, the UAV communication cell 126 may use the UAV communication cell 128 to relay the vehicle movement data to the UAV communication cell 122. In another scenario, the UAV communication cell 128 may receive vehicle movement data from the vehicle control module 106 of the vehicle 108(2). Since the UAV communication cell lacks a MEC node, the UAV communication cell 128 may transmit the vehicle movement data to the UAV communication cell 122 for processing by the MEC node 120. In turn, the MEC node 120 may process the vehicle movement data into vehicle guidance instructions.

Further, any UAV communication cell, whether attached or unattached, may relay data to another UAV communication cell. For example, the MEC node 112 may use the UAV communication cell 126 to obtain vehicle movement data of the vehicle 108(M) that is otherwise not available to the MEC node 112. Such vehicle movement data may be relayed to the UAV communication cell 114 of the MEC node 112 via the UAV communication cells 122 and 128. In another example, the MEC node 112 may have generated vehicle guidance instructions for the vehicles 108(1)-108(M) based on the received vehicle movement data. Accordingly, the MEC node 112 may use the UAV communication cell 114 to send the specific vehicle guidance instructions to the UAV communication cells that are currently in communication with the vehicle 108(1)-108(M). Thus, the UAV communication cell 114 may use the UAV communication cell 122 to broadcast vehicle guidance instructions to the vehicle control module 106(1) of the vehicle 108(1), and the UAV communication cell 128 to broadcast vehicle guidance instructions to the vehicle control module 106(2) of the vehicle 108(2). Likewise, the UAV communication cell 114 may use the UAV communication cell 126 to broadcast vehicle guidance instructions to the vehicle control module 106(J) of the vehicle 108(M).

Moreover, because multiple UAV communication cells have the ability to wirelessly communicate with each other, the multiple UAV communication cells may also act as a distributed computing network to process vehicle movement data without the involvement of MEC nodes. For example, the UAV communication cell 128 may receive vehicle movement data from vehicles in its covered geographical area. Subsequently, the UAV communication cell 128 may use the processing power of the UAV communication cell 122 and the UAV communication cell 126 to process the vehicle movement data into vehicle guidance instructions. A MEC node may also use the communication links between UAV communication cells to offload a portion of data processing to another MEC node and/or one or more other UAV communication cells. For example, the MEC node 120 may be unable to process the received vehicle movement data in a timely manner. Accordingly, the MEC node 120 may offload the vehicle movement data to the MEC node 112 for processing via a communication link between the UAV communication cell 122 and the UAV communication cell 114. However, if the UAV communication cell 122 or the UAV communication cell 114 determines that it or a UAV distributed computing network for which it is a member has sufficient processing power to process the vehicle movement data, the UAV communication cell 122 or the UAV communication cell 114 may simply perform the processing instead of sending the data to the MEC node 112.

In some embodiments, rather than being physically connected, a UAV communication cell may be wirelessly linked to a MEC node. In such embodiments, the wired cable may be replaced with a recharging or refueling dock that enables a UAV communication cell to receive power when the UAV is not airborne. Since the aloft time of a wireless UAV communication cell may be considerably shorter than a physically wired counterpart, a MEC node or a UAV deployment station may be equipped with multiple wireless UAV communication cells that are capable of being swapped such that one is charging or refueling while the other one is airborne, and vice versa.

Example UAV Communication Cell Components

Figure 2:
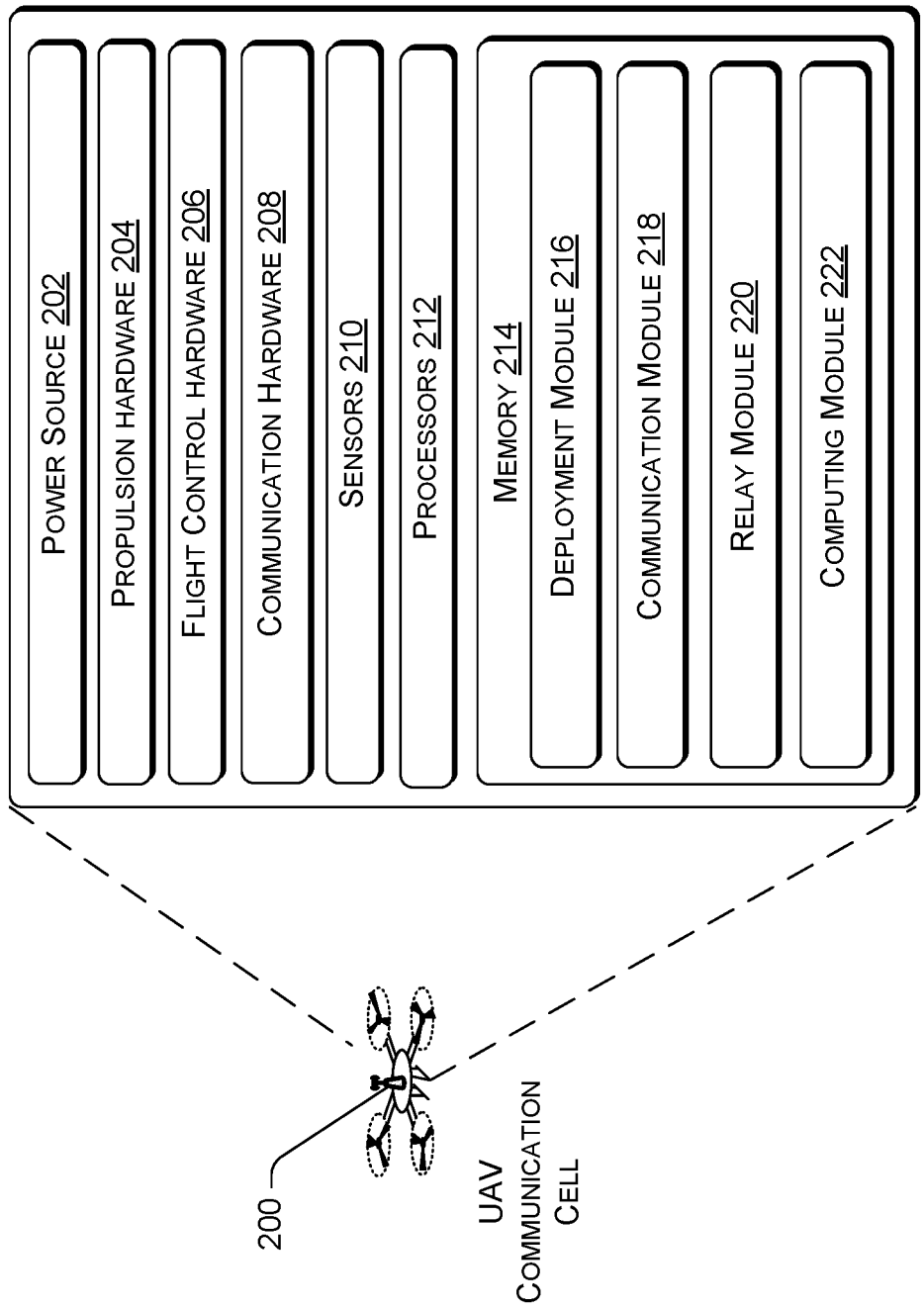
FIG. 2 is a block diagram showing various components of a UAV communication cell that supports CV2X communication.

FIG. 2 is a block diagram showing various components of a UAV communication cell that supports CV2X communication. The UAV communication cell 200 may include a power source 202, propulsion hardware 204, flight control hardware 206, communication hardware 208, sensors 210, one or more processors 212, and memory 214. The power source 202 may include electrical cells, combustible liquid fuel, combustible gas fuel, compressed gas, and/or other energy sources. In some embodiments, the power source 202 may be a ground-based energy source, rather than an energy source that is carried onboard the UAV communication cell 200. In such embodiments, a power line or fuel line may convey the energy from the ground-based energy source to the UAV communication cell 200. The propulsion hardware 204 may include mechanical devices that are capable of converting the energy provided by the power source 202 into movement of the UAV communication cell 200. For example, the propulsion hardware may include an internal combustion engine, an electrical motor, a jet engine, a turboprop engine, propellers, rotors, and/or so forth that are mounted on the wings and/or the body of the UAV communication cell 200.

The flight control hardware 206 may include actuators and control surfaces that are capable of steering the UAV communication cell 200. For example, the actuators may include hydraulic actuators, gas-powered actuators, electrical actuators, and/or so forth. The actuators may move or deflect control surfaces to control the movement of the UAV communication cell 200. The control surfaces may include tilt wings, rudders, slats, ailerons, elevators, trim tabs, fins, canards, and/or so forth. In some embodiments, the flight control hardware 206 may be integrated with the propulsion hardware 204. For example, such integrated hardware may include tilt rotors, variable pitch rotors, jet engines with movable thrust nozzles, and/or so forth.

The communication hardware 208 may include hardware components that enable the UAV communication cell 200 to communicate with other UAV communication cells and vehicles on the ground. In various embodiments, the communication hardware 208 further include cellular transceivers, hardware decoders and encoders, an antenna controller, a memory buffer, a network interface controller, a universal serial bus (USB) controller, and/or other signal processing and communication components. Accordingly, the communication hardware 208 may support the transmission and reception data for cellular communication, such as LTE-Uu interface communication and PC5 communication. The communication hardware 208 may further include one or more antennae that support the transmission and reception of data signals. The antennae may include a Yagi antenna, a horn antenna, a dish reflector antenna, a slot antenna, a waveguide antenna, a Vivaldi antenna, a helix antenna, a planar antenna, a dipole array antenna, an origami antenna, and/or other types of antennae. In some instances, an antenna may be oriented to point to a particular direction via electrical beam forming and/or via mechanical movement of one or more elements of the antenna by an antenna controller.

The sensors 210 may include a camera, a radar, a compass, an airspeed sensor, an altitude sensor, a global positioning system (GPS) sensor, control setting sensors, propulsion setting sensors, vehicle system health sensors, a transponder interrogator, and/or other sensors. The various sensors may provide operational information regarding the UAV communication cell 200 that is transmitted by the communication hardware 208 to the core network 102. In some instances, the UAV communication cell 200 may be further equipped with a transponder that provides vehicle identification and flight status information in response to a radio frequency interrogation.

Each of the processors 212 may be a single-core processor, a multi-core processor, a complex instruction set computing (CISC) processor, or another type of processor. The memory 214 may be implemented using computer-readable media, such as computer storage media. Computer-readable media includes, at least, two types of computer-readable media, namely computer storage media and communications media. Computer storage media includes volatile and non-volatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital storage disks or other optical storage, magnetic cassettes, magnetic tape, magnetic disk storage or other magnetic storage devices, or any other non-transmission medium that can be used to store information for access by a computing device. In contrast, communication media may embody computer-readable instructions, data structures, program modules, or other data in a modulated data signal, such as a carrier wave, or other transmission mechanisms.

The one or more processors 212 and the memory 214 may implement a deployment module 216, a communication module 218, a relay module 220, and a computing module 222. These modules may include routines, program instructions, objects, and/or data structures that perform particular tasks or implement particular abstract data types. The deployment module 216 may receive deployment or deactivation commands from an attached MEC node or a UAV deployment station. In response to a deployment command, the deployment module 216 may manipulate the propulsion hardware 204 and the flight control hardware 206 to fly the UAV communication cell 200 to a predetermined altitude and hover the UAV communication cell 200 within a predetermined distance from the MEC node or the UAV deployment station. In response to a deactivation command, the deployment module 216 may use the propulsion hardware 204 and the flight control hardware 206 to land the UAV communication cell 200 at a dock or an enclosure of the MEC node or the UAV deployment station.

The communication module 218 may coordinate the communications of the UAV communication cell 200 with other UAV communication cells and vehicles, such as the vehicles 108(1)-108(M). The communication module 218 may use the communication hardware 208 to establish communication links with other UAV communication cells and vehicle control modules of vehicles that are within range of the UAV communication cell 200. In some embodiments, a vehicle control module may use a base station to send a registration request to the core network 102 of the wireless carrier network. The registration request may include a unique identifier of the vehicle control module. For example, the unique identifier may be an Integrated Circuit Card Identifier (ICCID) or an International Mobile Subscriber Identity (IMSI) that is contained in a subscriber identity module (SIM) of the vehicle control module. In turn, the core network 102 may use the unique identifier to determine whether the vehicle control module is authorized to communicate with the UAV communication cells. The core network 102 may send an authentication credential (e.g., a secret key, a digital certificate, etc.) to the vehicle control module if the vehicle control module is authorized. Thus, the authentication credential may be presented by the vehicle control module in a connection request when the vehicle control module comes into communication range with a UAV communication cell. In response, the communication module 218 may recognize the authentication credential and establish a communication link with the vehicle control module. In this way, the communication module 218 may establish communication links with multiple vehicle control modules. In other embodiments, the communication module 218 may perform peer-to-peer authentication with the communication modules of other UAV communication cells to establish peer-to-peer communication links.

The relay module 220 may use the communication links by the communication module 218 to exchange data with other UAV communication cells. Each UAV communication cell may have a unique UAV identifier. Accordingly, the relay module 220 may use peer-to-peer communication to obtain the UAV identifiers of UAV communication cells that are in the vicinity of the UAV communication cell 200. In this way, the relay module 220 may generate a map of one or more UAV communication cells that are in the vicinity of the UAV communication cell 200, in which each UAV communication cell in the map is identified with a corresponding UAV identifier. In some embodiments, the relay module 220 may be configured to map immediately adjacent UAV communication cells that are communicating with the UAV communication cell 200, i.e., first-order neighboring UAV communication cells. In other embodiments, the relay module 220 may be configured to also map the UAV communication cells that are adjacent to and communicating with each of the first-order neighboring UAV communication cells, i.e., second-order neighboring UAV communication cells, and so on and so forth. In various embodiments, the orders of neighboring UAV communication cells that are mapped by the relay module 220 may be determined by a configuration setting of the relay module 220.

The relay module 220 may route incoming data received from other UAV communication cells to vehicle control modules of vehicles and additional UAV communication cells. In some instances, incoming vehicle movement data or vehicle guidance instructions received by the relay module 220 may include a UAV identifier that identifies the data or instructions as destined for a vehicle control module that is communicating with the UAV communication cell 200. Accordingly, the relay module 220 may relay the incoming data or instructions to the vehicle control module. In other instances, incoming vehicle movement data or vehicle guidance instructions received by the relay module 220 may include a UAV identifier that identifies the data or instructions as destined for a receiving UAV communication cell that is within the mapped network of the UAV communication cell 200. Accordingly, the relay module 220 may relay the incoming data or instructions to the other UAV communication cell. In turn, the receiving UAV communication cell may send the received vehicle movement data to an attached MEC node for processing. Subsequently, the receiving UAV communication cell may distribute the received vehicle guidance instructions to one or more vehicle control modules.

In some embodiments, the relay module 220 may route vehicle movement data received from vehicle control modules to other UAV communication cells. For example, the relay module 220 may be configured to share vehicle movement data with one or more additional UAV communication cells. The additional UAV communication cells may include cells that are downstream traffic-wise from the UAV communication cell 200. A first UAV communication cell is downstream traffic-wise from a second UAV communication cell when vehicle traffic on a roadway flows from a geographical area covered by the second UAV communication cell to a geographical area covered by the first UAV communication cell. In some instances, the additional UAV communication cells may include UAV communication cells that are not immediately adjacent to the UAV communication cell 200. In such embodiments, each set of data that is routed by the relay module 220 may be identified by a corresponding UAV identifier.

In additional embodiments, the relay module 220 may route vehicle movement data received from vehicle control modules of a first set of vehicles to a MEC node that is paired with the UAV communication cell 200. In turn, the MEC node may process the vehicle movement data into vehicle guidance instructions for distribution to vehicle control modules of a second set of vehicles. For example, vehicle movement data that indicates sudden braking by one vehicle may result in the MEC node generating a cascade of automatic braking instructions to multiple vehicles that are behind the braking vehicle. In some instances, the first set and the second set of vehicles may include one or more identical vehicles. A MEC node may have a deployment map of various deployed UAV communication cells in a geographical region. Accordingly, the MEC node may use the deployment map to route the vehicle guidance instructions to the appropriate UAV communication cells, such that the UAV communication cells may distribute the vehicle guidance instructions to the vehicle control modules of affected vehicles.

In some embodiments, the relay module 220 may be configured to perform UAV-prioritized processing of a particular set of vehicle movement data. In UAV-prioritized processing, the relay module 220 may initially direct a computing module 222 of the UAV communication cell 200 to attempt to process a set of received vehicle movement data into vehicle guidance instructions using the processors 212. If the processors 212 are unable to process the particular set of vehicle movement data in a timely manner, the computing module 222 may offload at least a portion or the entirety of the set of vehicle movement data to a distributed computing network of UAV communication cells that includes the UAV communication cell 200 for processing. Further, if the distributed computing network of UAV communication cells is unable to process the set of vehicle movement data into vehicle guidance instructions within a predetermined amount of time, the computing module 222 may offload at least a part or the entirety of the vehicle movement data to an attached MEC node for processing. Thus, the set of vehicle movement data may be processed by the processors 212 of the UAV communication cell, a distributed computing network of UAV communication cells, and/or a MEC node.

In various embodiments, the computing module 222 may coordinate with the computing modules of other UAV communication cells that are in the vicinity of the UAV communication cell 200 to form a distributed computing network. The network may include UAV communication cells that are within a predetermined order of relation to the UAV communication cell 200 (e.g., first-order, second-order, etc.). The distributed computing module 222 may make an offloading decision with respect to the set of vehicle movement data based on one or more factors. The factors may include an amount of data that is to be processed at a particular moment. For example, if the amount of data is less than or equal to a particular amount threshold, the computing module 222 may use the processors 212 to process the data. However, if the amount of data exceeds the particular amount threshold, the computing module 222 may offload the processing of at least a portion of the data to a distributed computing network of UAV communication cells. Likewise, if the amount of data exceeds another amount threshold, the computing module 222 may offload the processing of at least a portion of the data to an attached MEC node. In another example, the computing module 222 may make the offloading decision based on a processor usage percentage of the processors 212 or the distributed computing network at the time the data is to be processed. Thus, if the processor usage percentage of the processors 212 exceeds a first percentage threshold, the computing module 222 may offload the processing of at least a portion of the data to a distributed computing network of UAV communication cells. Likewise, if the processor usage percentage of the distributed computing network exceeds a second percentage threshold, the computing module 22 may offload the processing of at least a portion of the data to an attached MEC node. In this way, the computing module 222 may balance expected network latency and processing latency to provide the fastest return of vehicle guidance instructions for the set of vehicle movement data.

Example UAV Communication Controller Components

Figure 3:
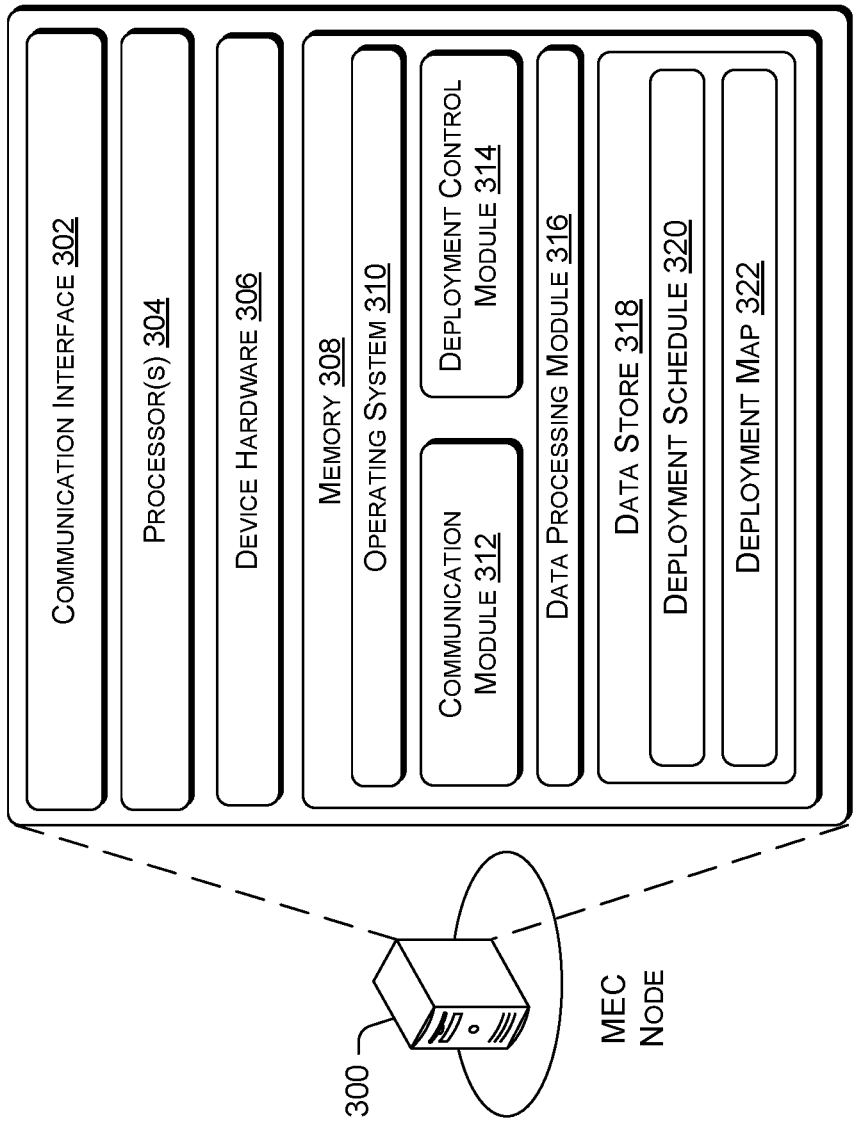
FIG. 3 is a block diagram showing various components of a mobile edge computing (MEC) node that interacts with a UAV communication cell to support CV2X communication.

FIG. 3 is a block diagram showing various components of a MEC node that interacts with a UAV communication cell to support CV2X communication. The MEC node 300 may be implemented on one or more computing devices. The computing devices may include general purpose computers, servers, or other electronic devices that are capable of receiving inputs, processing the inputs, and generating output data. In other embodiments, the computing devices may be virtual computing devices in the form of virtual machines or software containers that are hosted in a cloud.

The MEC node may include a communication interface 302, one or more processors 304, device hardware 306, and memory 308. The communication interface 302 may include wireless and/or wired communication components that enable the computing devices to transmit data to and receive data from other networked devices via the wireless carrier network and/or an additional network. For example, the additional network may be a local area network (LAN), a larger network such as a wide area network (WAN), or a collection of networks, such as the Internet. The device hardware 306 may include additional hardware that performs user interface, data display, data communication, data storage, and/or other server functions.

The memory 308 may be implemented using computer-readable media, such as computer storage media. Computer-readable media includes, at least, two types of computer-readable media, namely computer storage media and communications media. Computer storage media includes volatile and non-volatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital storage disks or other optical storage, magnetic cassettes, magnetic tape, magnetic disk storage or other magnetic storage devices, or any other non-transmission medium that can be used to store information for access by a computing device. In contrast, communication media may embody computer-readable instructions, data structures, program modules, or other data in a modulated data signal, such as a carrier wave, or other transmission mechanisms.

The processors 304 and the memory 308 of the computing devices may implement an operating system 310, a communication module 312, a deployment control module 314, and a data processing module 316. The modules may include routines, program instructions, objects, and/or data structures that perform particular tasks or implement particular abstract data types. The operating system 310 may include components that enable the computing devices to receive and transmit data via various interfaces (e.g., user controls, communication interface, and/or memory input/output devices), as well as process data using the processors 304 to generate output. The operating system 310 may include a presentation component that presents the output (e.g., display the data on an electronic display, store the data in memory, transmit the data to another electronic device, etc.). Additionally, the operating system 310 may include other components that perform various additional functions generally associated with an operating system. The memory 308 may further contain a data store 318 used by the MEC node 300.

The communication module 312 coordinates the communication between the MEC node 300 and a paired UAV communication cell. The UAV communication cell may communicate with the MEC node 300 via a physical communication link. The physical communication may be a direct wired link between the UAV communication cell and the MEC node 300. In such instances, the communication module 312 may establish a communication link with the UAV network cell that enables the exchange of data via a communication protocol, such as the transmission control protocol (TCP), the user datagram protocol (UDP), or another protocol. Alternatively, the MEC node 300 may communicate wirelessly with the paired UAV communication cell. As such, the communication module 312 may use a licensed band or an unlicensed band to establish a communication link with the paired UAV communication cell. In some embodiments, the MEC node 300 may be connected to a base station via a physical connection. Accordingly, the communication module 312 may establish a communication link with the base station for the transport of data between the MEC node 300 and the base station.

The deployment control module 314 may deploy and deactivate a UAV communication cell that is attached to the MEC node 300 based on commands received from the UAV deployment controller 116 of the core network 102. Alternatively, the deployment and deactivation may be performed by the deployment control module 314 based on a deployment schedule 320 stored in the data store of the MEC node 300 or in response to a request from a neighboring MEC node. In some embodiments, the deployment control module 314 may include a failover function that is able to receive reports of malfunction from an attached UAV communication cell. In turn, the deployment control module 314 may take remedial measures. These measures may include reporting the malfunction to the UAV deployment controller 116 for the dispatch of a repair crew, requesting that a neighboring MEC node or base station deploy a UAV communication cell to take over the workload, and/or so forth.

The data processing module 316 may process incoming vehicle movement data into vehicle guidance instructions for one or more vehicles. The vehicle guidance instructions are generated by the data processing module 316 to enable a vehicle to avoid an accident or a roadway obstacle. In some embodiments, the processing of the incoming vehicle movement data may be performed by the data processing module 316 in conjunction with the data processing modules of one or more other UAV communication cells in a distributed computing scenario. Following the processing, the data processing module 316 may use a deployment map 322 to route the vehicle guidance instructions to one or more UAV communication cells for distribution to the vehicle control modules of recipient vehicles.

Example Processes

FIGS. 4-7 present illustrative processes 400-700 for deploying UAV communication cells to support cellular vehicle-to-everything (CV2X) communication. Each of the processes 400-700 is illustrated as a collection of blocks in a logical flow chart, which represents a sequence of operations that can be implemented in hardware, software, or a combination thereof. In the context of software, the blocks represent computer-executable instructions that, when executed by one or more processors, perform the recited operations. Generally, computer-executable instructions may include routines, programs, objects, components, data structures, and the like that perform particular functions or implement particular abstract data types. The order in which the operations are described is not intended to be construed as a limitation, and any number of the described blocks can be combined in any order and/or in parallel to implement the process. For discussion purposes, the processes 400-700 are described with reference to the environment 100 of FIG. 1.

Figure 4:
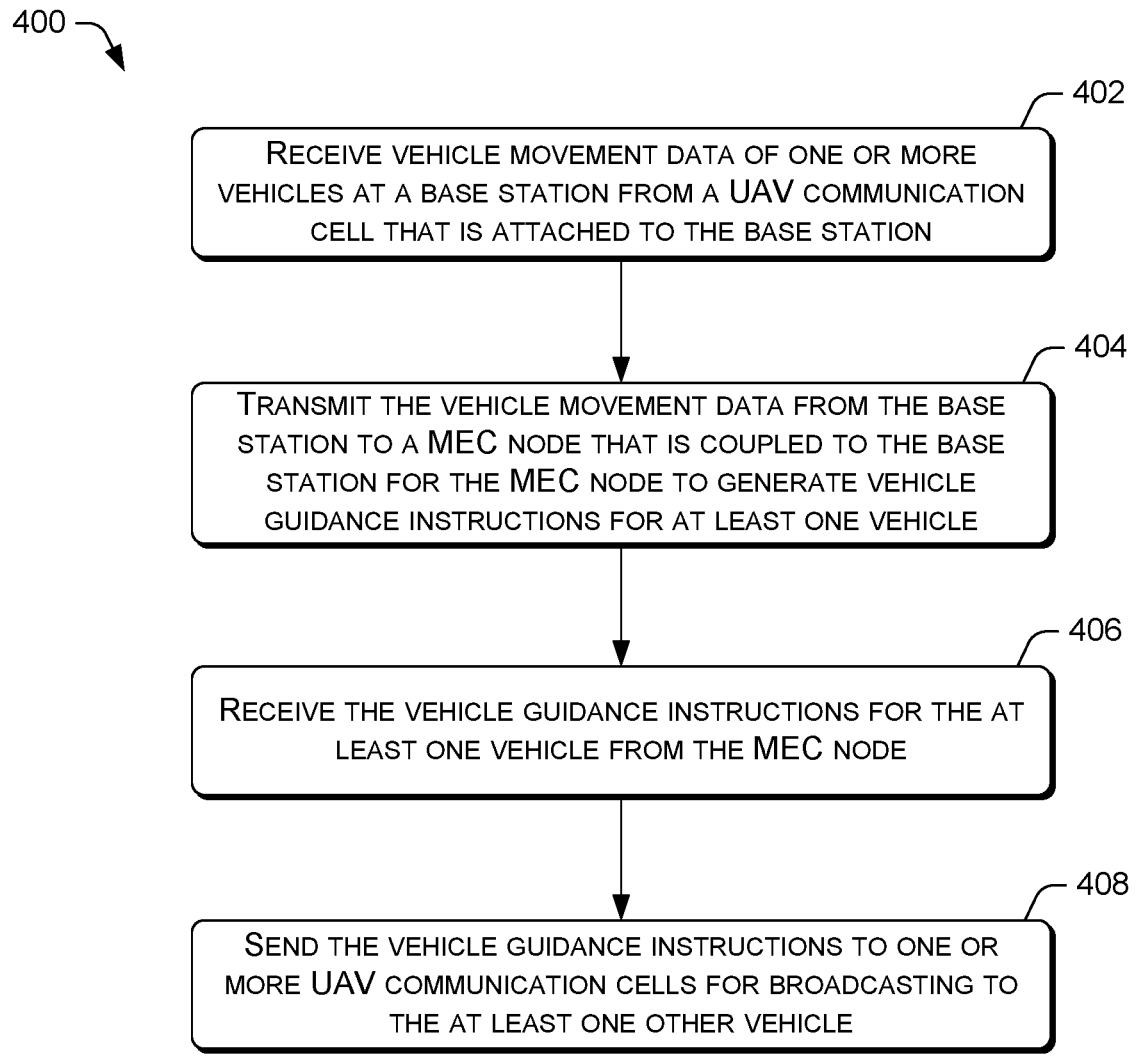
FIG. 4 is a flow diagram of an example process for a base station to use a UAV communication cell to support vehicle movement data processing by a MEC node.

FIG. 4 is a flow diagram of an example process 400 for a base station to use a UAV communication cell to support vehicle movement data processing by a MEC node. At block 402, a base station may receive vehicle movement data of one or more vehicles from a UAV communication cell that is attached to the base station. In some embodiments, the UAV communication cell may be deployed by the base station based on a deployment schedule. In other embodiments, the base station 104 may deploy the UAV communication cell when its own cellular communication transceiver malfunctions or is otherwise overloaded.

At block 404, the base station may transmit the vehicle movement data from the base station to a MEC node that is coupled to the base station for the MEC node to generate vehicle guidance instructions for at least one vehicle. The transmission of the vehicle movement data may be performed via a communication link established between the MEC node and the base station. For example, the vehicle movement data may indicate sudden braking by a vehicle. In turn, the MEC node may generate a cascade of automatic braking instructions to multiple vehicles that are behind the braking vehicle.

At block 406, the base station may receive the vehicle guidance instructions for at least one vehicle from the MEC node. The MEC node may receive the vehicle guidance instructions via the communication link established between the MEC node and the base station. The MEC node may have a deployment map of various active UAV communication cells in a geographical region. Accordingly, the MEC node may use the deployment map to identify one or more base stations that are capable of distributing the vehicle guidance instructions to the one or more vehicles. At block 408, the base station may send the vehicle guidance instructions to one or more UAV communication cells for broadcasting to the at least one vehicle.

Figure 5:
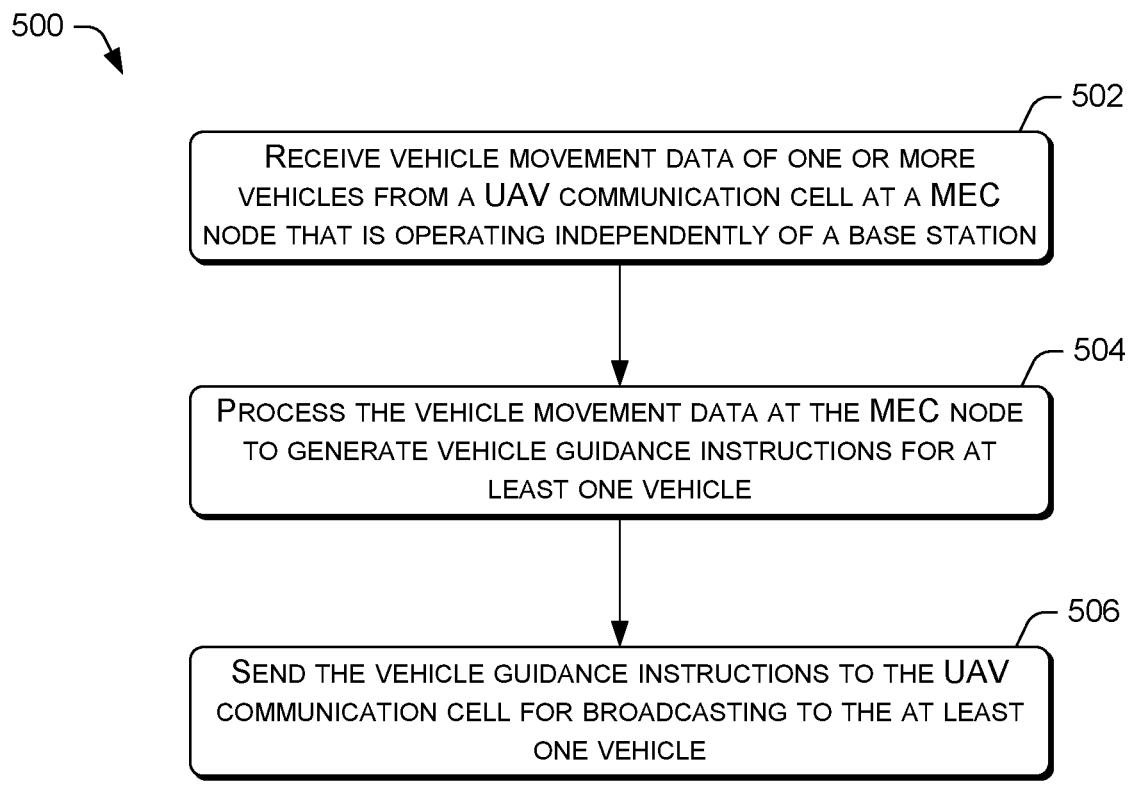
FIG. 5 is a flow diagram of an example process for a MEC node to use a UAV communication cell to receive vehicle movement data from vehicles and distribute vehicle guidance instructions to vehicles via CV2X communication.

FIG. 5 is a flow diagram of an example process 500 for a MEC node to use a UAV communication cell to receive vehicle movement data from vehicles and distribute vehicle guidance instructions to vehicles via CV2X communication. At block 502, a MEC node may receive vehicle movement data of one or more vehicles from a UAV communication cell, in which the MEC node operates independently of the base stations of a wireless carrier network. The UAV communication cell may receive vehicle movement data directly from one or more vehicle control modules. Alternatively, the vehicle movement data may be relayed to the UAV communication cell from another UAV communication cell.

At block 504, the MEC node may process the vehicle movement data at the MEC node to generate vehicle guidance instructions for at least one vehicle. For example, the vehicle movement data may indicate sudden braking by a vehicle. In turn, the MEC node may generate a cascade of automatic braking instructions to multiple vehicles that are behind the braking vehicle.

At block 506, the MEC node may send the vehicle guidance instructions to the UAV communication cell for broadcasting to the at least one vehicle. The MEC node may have a deployment map of various active UAV communication cells in a geographical region. Accordingly, the MEC node may use the deployment map to identify one or more base stations that are capable of distributing the vehicle guidance instructions to the one or more vehicles. For example, the MEC node may use the UAV communication cell to directly broadcast the vehicle guidance instructions to a vehicle control module of a vehicle. In another example, the MEC node may use the UAV communication cell to relay the vehicle guidance instructions to an additional UAV communication cell. In turn, the additional UAV communication cell may broadcast the vehicle guidance instructions to a vehicle control module of a vehicle.

Figure 6:
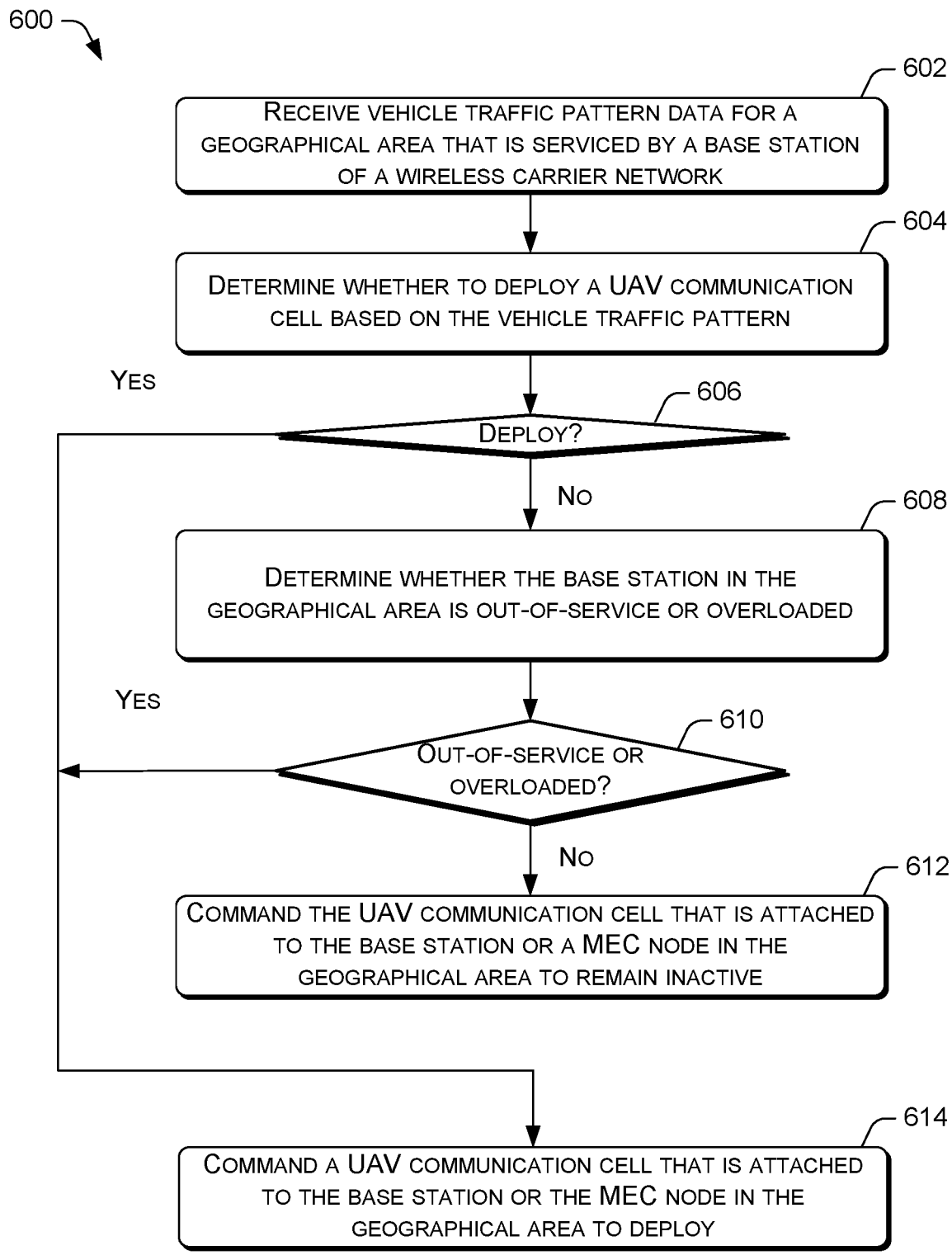
FIG. 6 is a flow diagram of an example process for deploying a UAV communication cell in a geographical area to support CV2X communication.

FIG. 6 is a flow diagram of an example process 600 for deploying a UAV communication cell in a geographical area to support CV2X communication. At block 602, the UAV deployment controller 116 may receive vehicle traffic data for a geographical area that is serviced by a base station of a wireless carrier network. In some embodiments, the UAV deployment controller 116 may receive the vehicle traffic data from a traffic monitoring service. At block 604, the UAV deployment controller 116 may determine whether to deploy a UAV communication cell based on the vehicle traffic data. For example, the UAV deployment controller 116 may direct the MEC node 112 to deploy the UAV communication cell 114 when vehicle traffic data indicates that a number of vehicles in a geographical area serviced by the base station exceeded a predetermined number threshold.

At decision block 606, if the UAV deployment controller 116 determines that the UAV communication cell is not to be deployed ("no" at decision block 606), the process 600 may proceed to block 608. At block 608, the UAV deployment controller 116 may determine whether the base station in the geographical area is out-of-service or overloaded with communication traffic. In various embodiments, the UAV deployment controller 116 may make such a determination based on notifications received from the base station or user devices serviced by the base station. For example, the base station may report that it has experienced an outage. In another example, a predetermined number of user devices serviced by the base station report that quality of service (QoS) values have dropped below or exceeded a threshold, thereby indicating that the base station is overloaded.

At decision block 610, if the UAV deployment controller 116 determines that the base station is not out of service or overloaded ("no" at decision block 610), the process 600 may proceed to block 612. At block 612, the UAV deployment controller 116 may command the UAV communication cell that is attached to the base station or a MEC node in the geographical area to remain inactive. Returning to decision block 606, if the UAV deployment controller 116 determines that the UAV communication is to be deployed ("yes" at decision block 606), the process 600 may proceed to 614. At block 614, the UAV deployment controller 116 may command the UAV communication cell that is attached to the base station or the MEC server in the geographical area to deploy. Returning to decision block 610, if the UAV deployment controller 116 determines that the base station is out of service or overloaded ("yes" at decision block 610), the process 600 may also proceed to block 614.

Figure 7:
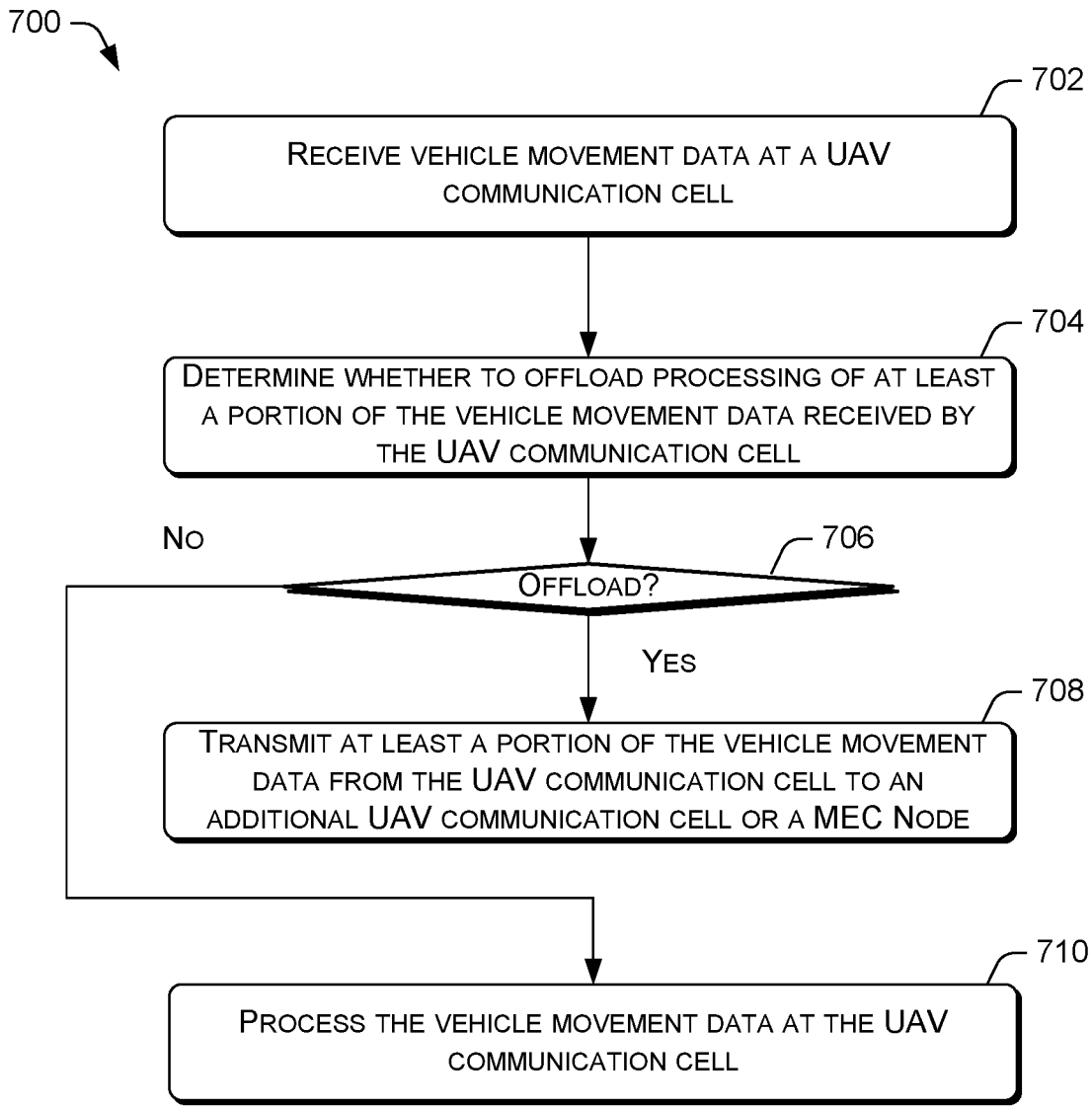
FIG. 7 is a flow diagram of an example process for offloading the processing of vehicle movement data to a different UAV communication cell or a different MEC node.

FIG. 7 is a flow diagram of an example process 700 for offloading the processing of vehicle movement data to a different UAV communication cell or a different MEC node. At block 702, a UAV communication cell may receive vehicle movement data. The UAV communication cell may receive vehicle movement data directly from one or more vehicle control modules. Alternatively, the vehicle movement data may be relayed to the UAV communication cell from another UAV communication cell.

At block 704, the UAV communication cell may determine whether to offload processing of at least a portion of the vehicle movement data received by the communication cell. In various embodiments, the UAV communication cell may offload at least a portion of the vehicle movement data if the cell determines that it is unable to process the vehicle movement data in a timely manner. For example, the processing time for the vehicle movement data may exceed a predetermined time limit.

At decision block 706, if the UAV communication cell determines that at least a portion of the vehicle movement data is to be offloaded ("yes" at decision block 706), the process 700 may proceed to block 708. At block 708, the UAV communication cell may transmit at least a portion of the vehicle movement data from the UAV communication cell to an additional UAV communication cell or a MEC node for processing. In some embodiments, the offloading may be performed so that at least a portion of the vehicle movement data may be processed by a distributed computing network that includes at least the UAV communication cell and the additional UAV communication cell. In other embodiments, the UAV communication cell may offload the processing of at least a portion of the vehicle movement data to an attached MEC node of the UAV communication cell. The offloading to the MEC node may be performed following a determination that the distributed computing network is unable to process at least a portion of the vehicle data in a timely manner.

However, if the UAV communication cell determines that at least a portion of the vehicle movement data is not to be offloaded ("no" at decision block 706), the process 700 may proceed to block 710. At block 710, the UAV communication cell may process the vehicle movement data at the UAV communication cell.

The use of attached or unattached UAV communication cells in conjunction with MEC nodes may provide low-latency processing of vehicle movement data received from vehicles to generate vehicle guidance instructions for one or more vehicles. This is because the vehicle movement data can be processed locally at the MEC nodes to generate vehicle guidance instructions, rather than relayed by the core network of a wireless carrier network to a centralized data center for processing and the eventual return of the same vehicle guidance instructions.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:
1. A computer-implemented method, comprising:
receiving, at a mobile edge computing (MEC) node that is paired with a corresponding base station of a wireless carrier network, a report of a malfunction of a transceiver of the corresponding base station or a communication traffic overload of the corresponding base station from the corresponding base station, wherein the MEC node is deployed in addition to a server of a centralized data center;
deploying, by the MEC node that is paired with the corresponding base station and deployed in addition to the server of the centralized data center, an unmanned aerial vehicle (UAV) communication cell to communicate with a plurality of vehicles in response to the malfunction of a transceiver of the corresponding base station or the communication traffic overload of the corresponding base station;
receiving vehicle movement data of one or more vehicles at the MEC node-that is paired with the corresponding base station from the UAV communication cell that is deployed by the MEC node to communicate with the one or more vehicles;

processing the vehicle movement data at the MEC node that is paired with the corresponding base station to generate vehicle guidance instructions for at least one vehicle; and sending the vehicle guidance instructions from the MEC node that is paired with the corresponding base station to the UAV communication cell that is deployed by the MEC node for broadcasting to at least one vehicle.

2. The computer-implemented method of claim 1, wherein the MEC node is directed by a deployment controller of the wireless carrier network to deploy the UAV communication cell.

3. The computer-implemented method of claim 1, wherein the UAV communication cell is attached to the MEC node via a wired connection that provides power to the UAV communication cell and a communication link between the UAV communication cell and the MEC node.

4. The computer-implemented method of claim 1, wherein the vehicle movement data is received by the UAV communication cell from a plurality of vehicles or received by the UAV communication cell from an additional UAV communication cell via cellular vehicle-to-everything (CV2X) communication.

5. The computer-implemented method of claim 4, wherein the vehicle movement data is obtained by the additional UAV communication cell from the one or more vehicles via cellular vehicle-to-everything (CV2X) communication.

6. The computer-implemented method of claim 1, wherein the broadcasting is performed by an additional UAV communication cell that receives the vehicle guidance instructions from the UAV communication cell via cellular vehicle-to-everything (CV2X) communication.

7. The computer-implemented method of claim 1, wherein the corresponding base station communicates with the MEC node via a dedicated communication link that is independent of a backhaul that connects the corresponding base station to a core network of the wireless carrier network.

8. The computer-implemented method of claim 1, wherein the vehicle movement data for a vehicle includes a current vehicle location of the vehicle, a direction of travel of the vehicle, a speed of travel for the vehicle, an acceleration rate of the vehicle, a deacceleration rate of the vehicle.

9. The computer-implemented method of claim 1, wherein the vehicle movement data for a vehicle includes one or more of a current vehicle location of the vehicle, a direction of travel of the vehicle, a speed of travel for the vehicle, an acceleration rate of the vehicle, or a deacceleration rate of the vehicle.

10. The computer-implemented method of claim 1, wherein the vehicle guidance instructions are used by a vehicle to perform autonomous driving of the vehicle, perform an automatic driving maneuver, or provide a driving condition to a driver of the vehicle.

11. A mobile edge computing (MEC) node, comprising:
one or more processors; and
memory having instructions stored therein, the instructions, when executed by the one or more processors, cause the one or more processors to perform acts comprising:
receiving, from a neighboring MEC node that is paired with a base station of a wireless carrier network, a command for the MEC node to deploy an unmanned aerial vehicle (UAV) communication cell to communicate with a plurality of vehicles, the MEC node being unpaired with any base station of the wireless carrier network;
deploying, by the MEC node, the unmanned aerial vehicle (UAV) communication cell to communicate with a plurality of vehicles;
receiving vehicle movement data of one or more vehicles at the MEC node from the UAV communication cell;
processing the vehicle movement data at the MEC node to generate vehicle guidance instructions for at least one vehicle; and
sending the vehicle guidance instructions to the UAV communication cell for broadcasting to the at least one vehicle.

12. The MEC node of claim 11, wherein each of the one or more vehicles includes a vehicle control module that is authenticated by a core network of the wireless carrier network to communicate with the UAV communication cell, the vehicle control module to provide corresponding vehicle movement data to the UAV communication cell and receive vehicle guidance instructions from the UAV communication cell.

13. The MEC node of claim 11, wherein the UAV communication cell is deployed by the MEC node based on a deployment schedule to receive the vehicle movement data of the one or more vehicles.

14. The MEC node of claim 11, wherein a deployment command from the neighboring MEC node by the base station paired to the neighboring.

15. The MEC node of claim 11, wherein the UAV communication cell is deployed in response to a number of user devices that are connected to the base station exceeding a predetermined number threshold, vehicle traffic data provided by a traffic monitoring service indicating that a number of vehicles in a geographical area serviced by the base station exceeding a predetermined number threshold, the base station reporting a service outage, or a predetermined number of user devices serviced by the base station reporting a quality of service (QoS) value has dropped below or exceeded a threshold.

16. The MEC node of claim 11, wherein the vehicle movement data is obtained by an additional UAV communication cell from the one or more vehicles and relayed to the UAV communication cell, and wherein the sending includes sending the vehicle guidance instructions from the UAV communication cell to another communication cell that broadcast the vehicle guidance instructions to the at least one vehicle.

17. The MEC node of claim 11, wherein the receiving includes receiving the vehicle movement data from the UAV communication cell when the UAV communication cell or a distributed computing network of multiple UAV communication cells that include the UAV communication cell is unable to process the vehicle movement data into the vehicle guidance instructions in a predetermined amount of time.

18. One or more non-transitory computer-readable media of an unmanned aerial vehicle (UAV) communication cell storing computer-executable instructions that upon execution cause one or more processors to perform acts comprising:
receiving vehicle movement data of one or more ground vehicles at the UAV communication cell;
in response to determining that the UAV communication cell is unable to process the vehicle movement data into vehicle guidance instructions for at least one ground vehicle in a predetermined amount of time, transmitting at least a portion of the vehicle movement data to an additional UAV communication cell; and in response to determining that the UAV communication cell is able to process the vehicle movement data into the vehicle guidance instructions in the predetermined amount of time, processing the vehicle movement data at the UAV communication cell into the vehicle guidance instructions for distribution to the at least one ground vehicle, where the vehicle guidance instructions include one or more automatic lane change directives for the at least one ground vehicle, one or more braking directives for the at least one ground vehicle, or one or more vehicle turning commands for the at least one ground vehicle.

19. The one or more non-transitory computer-readable media of claim 18, wherein the UAV communication cell and the additional UAV communication cell are part of a distributed computing network, and wherein the transmitting includes transmitting the vehicle movement data to a plurality of UAV communication cells of the distributed computing network for processing into the vehicle guidance instructions.

20. The one or more non-transitory computer-readable media of claim 18, wherein the additional UAV communication cell is connected to a mobile edge computing (MEC) node that processes the at least a portion of the vehicle movement data received by the additional UAV communication cell into the vehicle guidance instructions.

* * * * *